US007232991B2

(12) United States Patent
Yamaguchi

(10) Patent No.: US 7,232,991 B2
(45) Date of Patent: Jun. 19, 2007

(54) MASS SPECTROMETER

(75) Inventor: Shinichi Yamaguchi, Kyoto-fu (JP)

(73) Assignee: Shimadzu Corporation, Kyoto (JP)

(*) Notice: Subject to any disclaimer, the term of this patent is extended or adjusted under 35 U.S.C. 154(b) by 0 days.

(21) Appl. No.: 11/122,063

(22) Filed: May 5, 2005

(65) Prior Publication Data

US 2005/0247869 A1 Nov. 10, 2005

(30) Foreign Application Priority Data

May 6, 2004 (JP) ............................ 2004-137196

(51) Int. Cl.
*B01D 59/44* (2006.01)

(52) U.S. Cl. ....................... 250/287; 250/281; 250/291

(58) Field of Classification Search ................ 250/287, 250/290, 291
See application file for complete search history.

(56) References Cited

U.S. PATENT DOCUMENTS 6,300,625 B1 * 10/2001 Ishihara ...................... 250/287
6,624,410 B1 * 9/2003 Voss ........................... 250/291
6,828,553 B2 * 12/2004 Weiss ......................... 250/287
6,906,321 B2 * 6/2005 Yamaguchi ................. 250/287
6,949,736 B2 * 9/2005 Ishihara ...................... 250/282
6,949,738 B2 * 9/2005 Yamaguchi et al. ........ 250/287
2005/0045817 A1 * 3/2005 Yamaguchi et al. ........ 250/287

FOREIGN PATENT DOCUMENTS

JP 11-195398 7/1999

* cited by examiner

*Primary Examiner*—David Vanore
(74) *Attorney, Agent, or Firm*—Westerman, Hattori, Daniels & Adrian, LLP.

(57) ABSTRACT

In the mass spectrometer of the present invention, first the length of flight time of a known ion is measured at every turn of the loop orbit. Ideally, the length of flight time at every turn is equal to one calculated based on the speed of the ion and the path length of the loop orbit, but an actual length of flight time deviates from it in a reproducible fashion. Thus, in the present invention, the deviation information is stored in the correction memory at every turn. In measuring an unknown ion, the unknown ion is made to fly the loop orbit a predetermined number of times. Then the flight time of the unknown ion that has flown the loop orbit a predetermined number of turns is measured, and the deviations of the flight time at the turns are corrected using the correction data stored in the correction memory. The mass to charge ratio of the unknown ion is calculated based on the corrected flight time. Thus the deviation of the actual flight time from the theoretical or ideal one is canceled, and the calculated mass to charge ratio becomes more precise.

5 Claims, 2 Drawing Sheets

MASS SPECTROMETER

The present invention relates to a mass spectrometer, in particular to a time-of-flight type mass spectrometer (TOF-MS) in which the flight space is formed as a loop in which the ions to be analyzed repeatedly fly. In the present invention, the "loop" includes a straight line or a curved line on which ions fly to and fro repeatedly, for, in both cases, ions fly the same path repeatedly.

BACKGROUND OF THE INVENTION

In a TOF-MS, ions accelerated by an electric field are injected into a flight space where no electric field or magnetic field is present. The ions are separated by their mass to charge ratios according to the time of flight until they reach and are detected by a detector. Since the difference in the flight time of two ions having different mass to charge ratios is larger as the flight path is longer, it is preferable to design the flight path as long as possible in order to enhance the resolution of the mass to charge ratio of a TOF-MS. In many cases, however, it is difficult to incorporate a long straight path in a TOF-MS due to the limited overall size, so that various measures have been taken to effectively lengthen the flight length.

In the Japanese Unexamined Patent Publication No. H11-195398, a loop orbit is formed using plural toroidal type sector-formed electric fields, and the ions are guided to fly the loop orbit repeatedly, whereby the effective flight length is elongated. In those mass spectrometers, as the number of turns an ion flies the loop orbit is larger, the flight path is longer, so that the resolution of the mass analysis becomes high as the number of turns is larger.

The mass to charge ratio of an ion is calculated based on the flight time of the ion and the number of turns it flies the loop orbit, where the flight time is the length of time from the time point when the ion starts the ion source and to the time point when it arrives at the ion detector. But, the actual flight time length of an ion is not exactly equal to a calculated one, and the discrepancy between the actual time length and the calculated time length may vary depending on the number of turns. Conventionally such an discrepancy is not taken into consideration in calculating the mass to charge ratio of an ion, so that the value of the calculated mass-to-charge ratio was not adequately reliable and, in the worst case, the calculation results were unable to be used in identifying the sample.

The cause of the discrepancy is not exactly known, but, since the discrepancy appears in a reproducible fashion, it is assumed to be caused as follows. A case is supposed where, as shown in FIG. 3, an ion is introduced into a circular orbit, flies the orbit a predetermined number of turns, and leaves the orbit. The expected orbit is the central one C0 shown by the chain line, and appropriate voltages are applied to the electrodes (not shown in the drawing) arranged along the orbit to produce proper electric fields along the orbit and lets an ion fly the orbit C0. But actually, the electric fields are not produced exactly as designed due to, for example, misshapes in the electrodes or asymmetry of the electrode arrangement, so that an actual orbit deviates from the expected one C0, and an ion may fly a smaller orbit C1 or a larger orbit C2 in a flight. Since the path length of an orbit varies from orbit to orbit, the length of time that an ion flies one turn of an orbit varies even if the speed of the ion is constant. If an ion flies the smaller orbit C1, the flight time is shorter than calculated, and if it flies the larger orbit C2, the flight time is longer than calculated.

SUMMARY OF THE INVENTION

In view of the forgoing problems, the main object of the present invention is to provide a mass spectrometer using a loop orbit that has an improved accuracy in determining the mass to charge ratio of a sample ion.

If the flight time of a known ion (i.e., an ion having a known mass to charge ratio) is actually measured at every turn of a loop orbit, the mass to charge ratio of an unknown ion (i.e., an ion having an unknown mass to charge ratio) can be determined more precisely based on the measured flight time of the ion after flying the loop orbit a predetermined number of turns.

Thus according to the first construction of the present invention, a mass spectrometer includes:

an ion source;

a loop orbit;

an ion detector;

a flight time measurer for measuring the flight time of an ion flying the loop orbit;

a correction memory for storing correction information of deviations of actually measured lengths of flight time of a known ion from calculated ones at plural number of turns; and a mass calculator for determining a mass to charge ratio of an unknown ion using information of the flight time of the unknown ion measured at plural number of turns, the calculated lengths of flight time for the plural number of turns, and the correction information.

In the first mass spectrometer of the present invention, first the length of flight time of a known ion is measured at every turn of the loop orbit. Ideally, the length of flight time at every turn is equal to calculated based on the speed of the ion and the path length of the loop orbit, but an actual length of flight time deviates from it in a reproducible fashion. Thus, in the present invention, the deviation information is stored in the correction memory at every turn. In measuring an unknown ion, the unknown ion is made to fly the loop orbit a predetermined number of times.

Normally, the number of turns of an ion flying a loop orbit is difficult to determine if the mass to charge ratio of the ion is completely unknown. Thus it is preferable to let the ion fly a short straight path beforehand, and roughly estimate the mass to charge ratio of the ion from the flight time of the straight path. Using the information of the roughly estimated mass to charge ratio, it is possible to make the ion fly the loop orbit a desired number of turns.

Then the flight time of the unknown ion that has flown the loop orbit a predetermined number of turns is measured, and the deviations of the flight time at the turns are corrected using the correction data stored in the correction memory. The mass to charge ratio of the unknown ion is calculated based on the corrected flight time. Thus the deviation of the actual flight time from the theoretical or ideal one is canceled, and the calculated mass to charge ratio becomes more precise.

Alternatively, instead of storing the respective correction information, it is possible to make a formula or a calibration curve from the actually measured flight time of known ions, where the deviations are incorporated in the formula or the calibration curve. In this case, the mass to charge ratio of an unknown ion is calculated by applying data of measured flight time to the formula or the calibration curve.

Thus the second mass spectrometer of the present invention includes:

an ion source;

a loop orbit;

an ion detector;

a flight time measurer for measuring the flight time of an ion flying the loop orbit;

a formula generator for generating a formula for determining a mass to charge ratio of an unknown ion based on the actual flight time of a known ion measured at plural number of turns;

a formula memory for storing the formula; and a mass calculator for determining a mass to charge ratio of an unknown ion using the formula and the flight time of the unknown ion measured at plural number of turns.

Similarly, the third mass spectrometer of the present invention uses a calibration curve instead of the formula described above.

In all the first to third mass spectrometers of the present invention, it is preferable to measure actual flight time of as many kinds of ions having known mass to charge ratio as possible, and to derive the correction information, the formula or the calibration curve from the actually measured flight time.

Owing to the present invention, the mass to charge ratio of unknown ions can be determined at high accuracy even though their actual orbits deviate from the designed one from turn to turn. This improves the validity of determination of the sample measured.

DETAILED DESCRIPTION OF A PREFERRED EMBODIMENT

Figure 1:
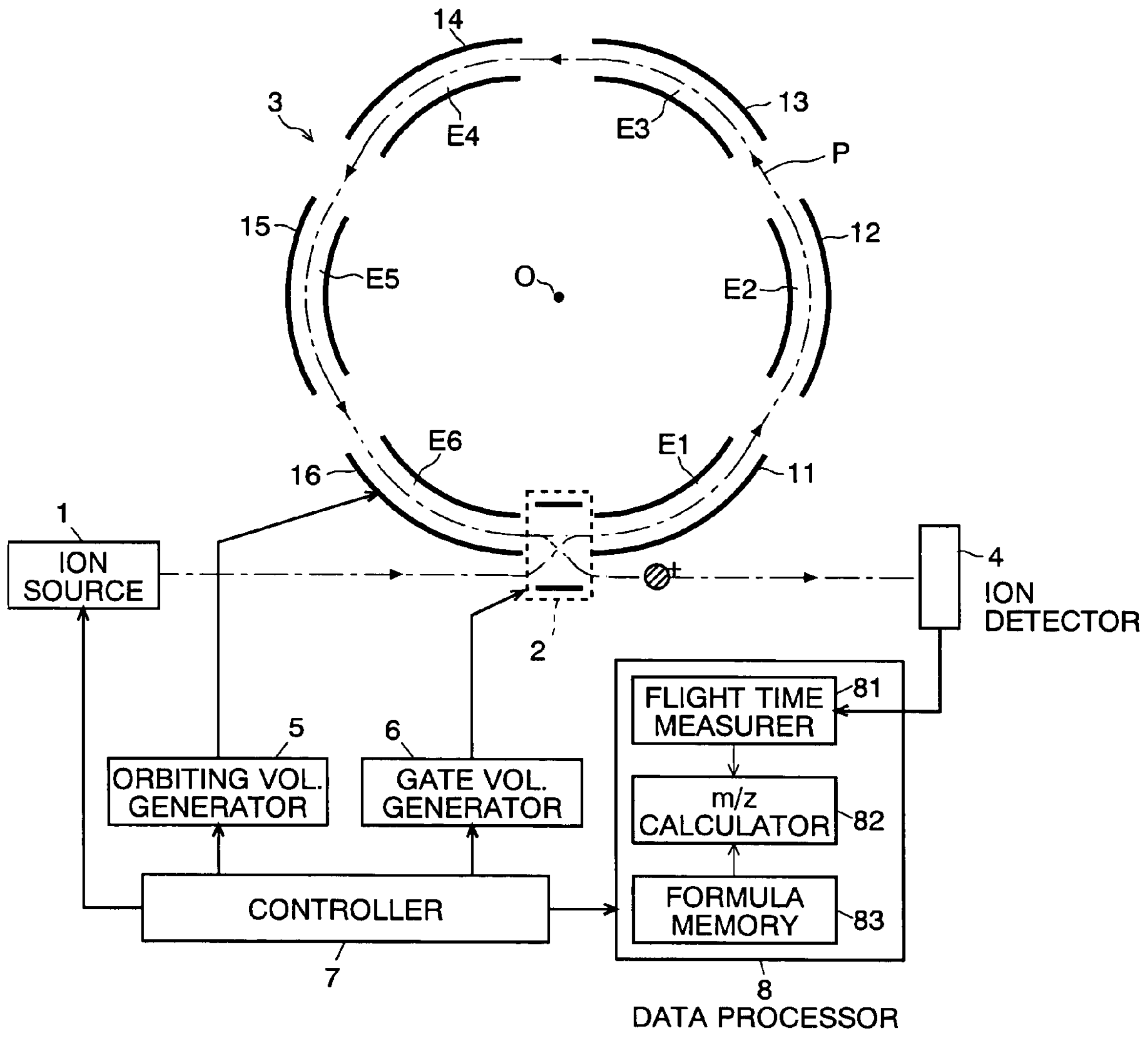
FIG. 1 is a schematic diagram of a mass spectrometer embodying the present invention.
Figure 2:
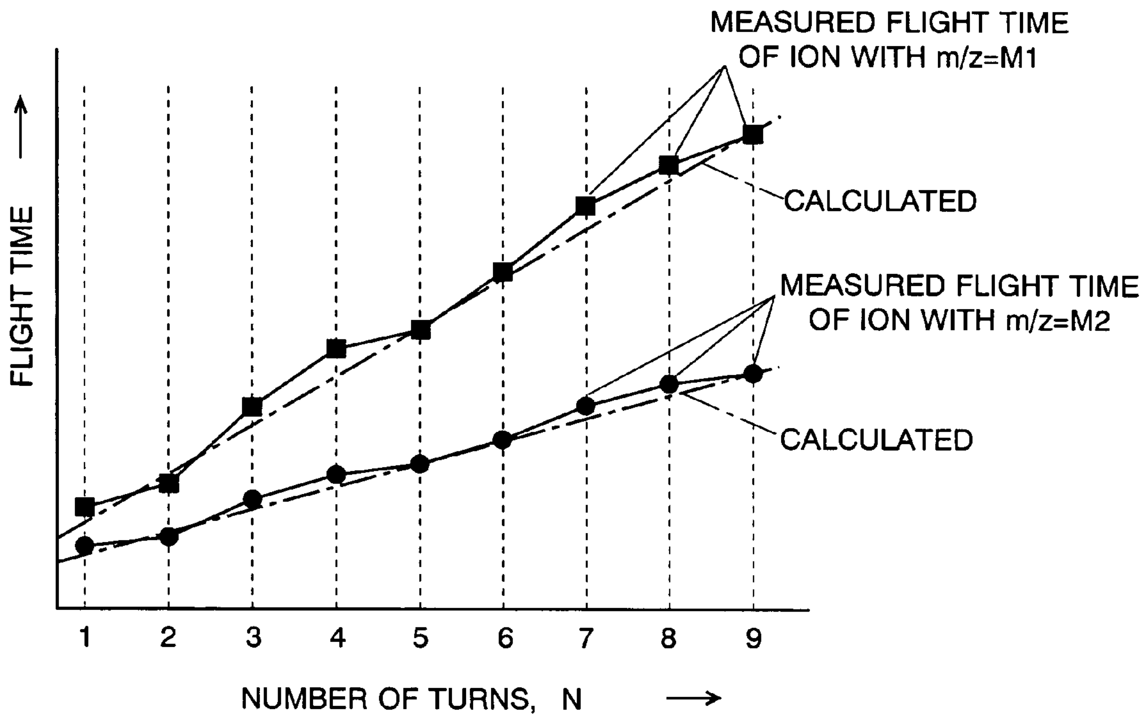
FIG. 2 is a graph of the actually measured flight time vs. the number of turns of an ion flying a loop orbit.
Figure 3:
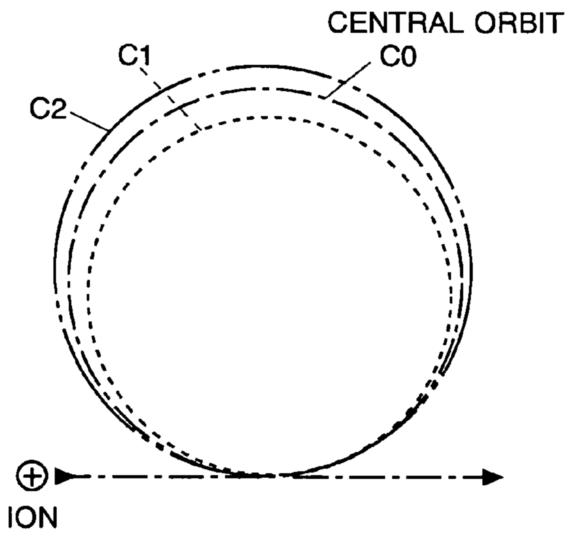
FIG. 3 is a plan view of a circular orbit showing deviations of the loop orbit.

A mass spectrometer embodying the present invention is described referring to FIGS. 1 and 2. FIG. 1 shows a schematic diagram of the mass spectrometer of the present embodiment. In FIG. 1, the ion source 1, the gate electrodes 2, the flight space 3 containing six fractional cylindrical electrode sets 11-16 and the ion detector 4 are housed in a vacuum chamber not shown.

The ion source 1 is the starting point of ions to be measured, and a sample to be analyzed is ionized there. Any ionizing method can be used in the present invention. When, for example, the mass spectrometer of the present embodiment is used as the detector of a gas chromatograph, the ion source 1 uses the electron impact ionization method or the chemical ionization method. When the mass spectrometer is used as the detector of a liquid chromatograph, the ion source 1 uses the atmospheric pressure chemical ionization method or the electrospray ionization method. When the sample is a macromolecular compound such as a protein, the MALDI (Matrix Assisted Laser Desorption Ionization) method is suitable. The ion source 1 does not necessarily produce ions by itself, but it can be such one that temporarily holds ions produced by another ion source. An ion trap is one of such types of ion sources.

In the flight space 3, six fractional cylindrical electrode sets 11, 12, 13, 14, 15 and 16 are placed along the circular loop orbit P. The number of the fractional cylindrical electrodes may be other than six, of course. The six fractional cylindrical electrode sets 11–16 are made by cutting a double wall cylinder into six equal fractions, and are placed symmetrically around the central axis O. By applying appropriate voltages to the six fractional cylindrical electrode sets 11–16, cylindrical electric fields E1–E6 are generated between the inner and outer electrodes of the six fractional cylindrical electrode sets 11–16, which forms an almost circular ion flying space. In FIG. 1, P denotes the central orbit of ions in the ion flying space. The gate electrodes 2 placed between the first and sixth fractional cylindrical electrode sets 11 and 16 are used for directing an ion coming from the ion source 1 to the loop orbit P, and also directing the ion flying on the loop orbit P to the ion detector 4.

The six fractional cylindrical electrodes 11–16 are given the appropriate voltages from the orbiting voltage generator 5, and the gate electrodes 2 are given another appropriate voltage from the gate voltage generator 6. The orbiting voltage generator 5 and the gate voltage generator 6 are controlled by the controller 7. The detection signal generated by the ion detector 4 is sent to the data processor 8, where the length of time from the time point when an ion starts the ion source 1 and to the time point when the ion arrives at the ion detector 4 is measured. Based on the flight time, the mass to charge ratio of the ion is calculated. The controller 7 and the data processor 8 can be constituted by a personal computer and appropriate program sets.

The loop orbit P may not be circular as shown in FIG. 1. It may be shaped long circular, elliptic or as the letter "8". Further, it may be a helical one on which an ion climb up/down, or a linear one on which an ion moves to and fro repeatedly.

In the above mass spectrometer, a sample is analyzed as follows. Under the control of the controller 7, ions of the sample are ejected from the ion source 1, and, at the same time, the controller 7 sends a start signal to the data processor 8. The gate voltage generator 6 then applies an appropriate voltage to the gate electrodes 2 for directing the ions to the loop orbit P in a time period spanning the time point when the ions pass the gate electrodes 2, so that the ions enter the loop orbit P and fly it repeatedly after that.

At the time point a predetermined time period prior to the time point when the ions are assumed to pass the gate electrodes 2 after flying the loop orbit a predetermined number of turns, the gate voltage generator 6 applies another appropriate voltage to the gate electrodes 2 to direct the ions to the ion detector 4. This means that the voltage applied to the gate electrodes 2 determines the number of turns. After leaving the loop orbit P, the ions enter the ion detector 4, which generates a signal corresponding to the number of ions detected. The ion detection signal representing the intensity of ion at every moment is sent to the data processor 8. Since the length of flight time of an ion depends on its mass to charge ratio, the length of time from the time point when the ion starts the ion source 1 to the time point when it arrives at the ion detector 4 depends on the mass to charge ratio. Ions of different mass to charge ratios show different lengths of flight time, and the difference in the flight time is larger as the difference in the mass to charge ratio is larger. That is, the resolution of the mass to charge ratio is better as the number of turns is larger in the mass spectrometer of the present embodiment.

The method of calculating the mass to charge ratio is then described. Ions of different mass to charge ratios fly at different speeds, and the length of flight time depends on the flying speed and the flight distance. If the flight distance is fixed, the mass to charge ratio can be calculated from the length of flight time. Ideally, the flight distance is the sum of the distance from the ion source 1 to the gate electrodes 2, that from the gate electrode 2 to the ion detector 4, and that of the periphery (or circumference) of the loop orbit P multiplied by the number of turns. Thus, as the number of turns increases by one, the flight distance increases by the periphery (or circumference) of the loop orbit P, and the flight time length increases accordingly. This is shown in FIG. 2. Ideally (or in calculation), the flight time of an ion having mass to charge ratio (m/z) M1 or M2 increases linearly as the number of turns N increases, as shown by the chain lines. Conventionally, the mass to charge ratio of an unknown ion was calculated based on the ideal linear relationship. But, actually, the flight time of the ions having mass to charge ratios M1 and M2 deviates from the ideal line, as shown by the symbols ■ and ● in FIG. 2.

In the mass spectrometer of the present embodiment, the flight time of ions having different known mass to charge ratios are measured beforehand at every turn of the loop orbit, as those having mass to charge ratios M1 and M2 in FIG. 2. Based on the measured flight time lengths, the ideal formula for determining a mass to charge ratio from the lengths of flight time is corrected, and the corrected formula incorporating the deviations is stored in the formula memory 83. Instead of the corrected formula, the ideal formula and correction data at every turn can be stored in the formula memory 83. Further, instead of formulas, a lookup table or a calibration curve for determining the mass to charge ratio based on the number of turns and the flight time lengths can be used. Any other method can be used to determine the mass to charge ratio from the number of turns and the flight time lengths, but the important thing is that the deviation of the actual flight time lengths from the ideal ones must be included in the method.

When an ion having unknown mass to charge ratio is measured, the number of turns must be known to determine the mass to charge ratio from the flight time. But it is difficult or unpractical to determine where the ion is on the loop orbit P, so that it is impossible to control the ion having unknown mass to charge ratio to fly the loop orbit a desired number of turns. Thus, when such an ion is to be measured, it is made to fly a straight path before the loop orbit, and the flight time is measured. This enables a rough estimation of the mass to charge ratio of the ion. Based on the rough estimation, the ion can be controlled to fly the loop orbit P a desired number of turns. Under such a control, the flight time length of the ion for every turn is calculated in the flight time calculator 81 of the data processor 8. The mass calculator (m/z calculator) 82 reads out the above-described formula from the formula memory 83, obtains the information of the number of turns from the controller 7, and calculates the mass to charge ratio of the ion. Using a larger number of turns, the precision of the determined mass to charge ratio is improved.

The above method is applicable to not only ions of a single mass to charge ratio ejected from the ion source 1, but also it is possible to determine plural mass to charge ratios when a mixture of ions of plural mass to charge ratios fly the loop orbit if the number of turns of the ions are known and ions of different mass to charge ratios arrive at the ion detector 4 at different time points so that the detection signal and every kind of ion are adequately corresponded. In this case also the mass to charge ratio of every kind of ion can be precisely determined from the number of turns and the flight time.

Although only some exemplary embodiments of the present invention have been described in detail above, those skilled in the art will readily appreciate that many modifications are possible without materially departing from the present invention. Accordingly, all such modifications are intended to be included within the scope of the present invention.

What is claimed is:

1. A mass spectrometer comprising:
an ion source;
a loop orbit;
an ion detector;
a flight time measurer for measuring a flight time of an ion flying the loop;
a correction memory for storing correction information based on deviation of actual lengths of flight time of an ion having a known mass to charge ratio from calculated lengths of flight time at plural number of turns;
a mass calculator for determining a mass to charge ratio of an ion having an unknown mass to charge ratio using information of flight time of the unknown ion measured at plural number of turns, calculated lengths of flight time for the plural number of turns, and the correction information;
a straight orbit before the loop orbit;
a preliminary flight time measurer for measuring a flight time of the unknown ion flying the straight orbit; and
a number estimator for estimating a number of turns that the unknown ion flies the loop orbit based on the flight time of the straight orbit.

2. A mass spectrometer comprising:
an ion source;
a loop orbit;
an ion detector;
a flight time measurer for measuring a flight time of an ion flying the loop orbit;
a formula generator for generating a formula for determining a mass to charge ratio of an unknown ion based on actual flight time lengths of an ion having a known mass to charge ratio measured at plural number of turns;
a formula memory for storing the formula; and
a mass calculator for determining a mass to charge ratio of an ion having an unknown mass to charge ratio using the formula and flight time of the unknown ion measured at plural number of turns.

3. The mass spectrometer according to claim 2, wherein the mass spectrometer further comprises:
a straight orbit before the loop orbit;
a preliminary flight time measurer for measuring a flight time of the unknown ion flying the straight orbit; and
a number estimator for estimating a number of turns that the unknown ion flies the loop orbit based on the flight time of the straight orbit.

4. A mass spectrometer comprising:
an ion source;
a loop orbit;
an ion detector;
a flight time measurer for measuring a flight time of an ion flying the loop orbit;
a calibration curve generator for generating a calibration curve for determining a mass to charge ratio of an unknown ion based on actual flight time of an ion having a known mass to charge ratio measured at plural number of turns;

a calibration curve memory for storing the calibration curve; and a mass calculator for determining a mass to charge ratio of an ion having an unknown mass to charge ratio using the calibration curve and flight time of the unknown ion measured at plural number of turns.

5. The mass spectrometer according to claim 4, wherein the mass spectrometer further comprises:

a straight orbit before the loop orbit;

a preliminary flight time measurer for measuring a flight time of the unknown ion flying the straight orbit; and a number estimator for estimating a number of turns that the unknown ion flies the loop orbit based on the flight time of the straight orbit.

* * * * *